(12) United States Patent
Konishi (10) Patent No.: US 9,097,613 B2
(45) Date of Patent: Aug. 4, 2015

(54) DRIVING CONTROLLER, DRIVING CONTROL PROGRAM, AND MEASURING DEVICE

(75) Inventor: Takao Konishi, Kyoto (JP)

(73) Assignee: HORIBA, LTD., Kyoto (JP)

( * ) Notice: Subject to any disclaimer, the term of this patent is extended or adjusted under 35 U.S.C. 154(b) by 971 days.

(21) Appl. No.: 12/976,392

(22) Filed: Dec. 22, 2010

(65) Prior Publication Data

US 2011/0160911 A1 Jun. 30, 2011

(30) Foreign Application Priority Data

Dec. 25, 2009 (JP) ................................. 2009-295734
Sep. 22, 2010 (JP) ................................. 2010-211918

(51) Int. Cl.
*G05D 13/00* (2006.01)
*G01P 3/00* (2006.01)
*G01M 17/007* (2006.01)

(52) U.S. Cl.
CPC ................................. *G01M 17/0074* (2013.01)

(58) Field of Classification Search
CPC ....... B60K 28/10; B60K 31/00; G01M 15/10; G01M 15/102; G05B 15/02; G06F 7/00; G06F 9/00; G06F 19/00; G06F 17/00; H04N 5/52
USPC ......... 700/275, 278, 280; 701/29.1; 73/23.31, 73/114.7; 702/24
See application file for complete search history.

(56) References Cited

U.S. PATENT DOCUMENTS

| | | | | |
|---|---|---|---|---|
| 3,998,095 A | * | 12/1976 | Tinkham et al. | 73/114.71 |
| 5,561,238 A | * | 10/1996 | Rumez et al. | 73/23.31 |
| 6,470,732 B1 | * | 10/2002 | Breton | 73/23.31 |
| 7,103,460 B1 | * | 9/2006 | Breed | 701/32.9 |
| 8,184,206 B2 | * | 5/2012 | Magnusen | 348/678 |
| 2009/0281695 A1 | * | 11/2009 | Wilson | 701/54 |
| 2012/0239308 A1 | * | 9/2012 | Miller et al. | 702/24 |

FOREIGN PATENT DOCUMENTS

| | | |
|---|---|---|
| JP | 09-222384 | 8/1997 |
| JP | 2005-003560 | 1/2005 |

* cited by examiner

*Primary Examiner* — Sean Shechtman
*Assistant Examiner* — Steven Garland
(74) *Attorney, Agent, or Firm* — Brooks Kushman P.C.

(57) ABSTRACT

In order to possibly suppress noise components contained in a signal value of a detection signal for use in controlling a rate of rotations or speed, an driving controller receives a detection signal in accordance with a rate of rotations or speed and acquires a signal value of the detection signal every predetermined sampling time, and controls an actuator at control timings with predetermined intervals using the signal value, so that the rate of rotations or speed is controlled at each of the control timings in accordance with variation aspects of a plurality of signal values acquired before the outstanding control timing.

6 Claims, 8 Drawing Sheets

DRIVING CONTROLLER, DRIVING CONTROL PROGRAM, AND MEASURING DEVICE

CROSS-REFERENCE TO RELATED APPLICATIONS

This application claims the benefit of JP 2009-295734 filed Dec. 25, 2009 and JP 2010-211918 filed Sep. 22, 2010. The disclosures of which are incorporated in their entirety by reference herein.

TECHNICAL FIELD

The present invention generally relates to an driving control technique, and in particular to a driving controller and a driving control program for controlling a rate of rotations or speed in a vehicle operating device etc. such as a chassis dynamometer and the like.

BACKGROUND ART

In a conventional vehicle performance test system, as disclosed in Patent literature 1, a vehicle mounted on a chassis dynamometer is run according to a prescribed driving mode by an automatic driving robot, and an exhaust gas discharged at that time is collected by a constant volume sampler. Then, the collected gas samples are supplied to a gas measuring device equipped with a plurality of gas analyzers for analyzing the gas samples based on different measurement principles so that each of the respective components of the gas samples is measured. Thus, the performance test of the vehicle is carried out.

The automatic driving robot is equipped with actuator parts including such as a pedal actuator for operating a pedal of the vehicle and a shift lever actuator for operating a shift lever and further equipped with a controller for controlling the actuator parts. The controller controls the actuator parts so that the vehicle is set to a given driving mode.

Figure 8:
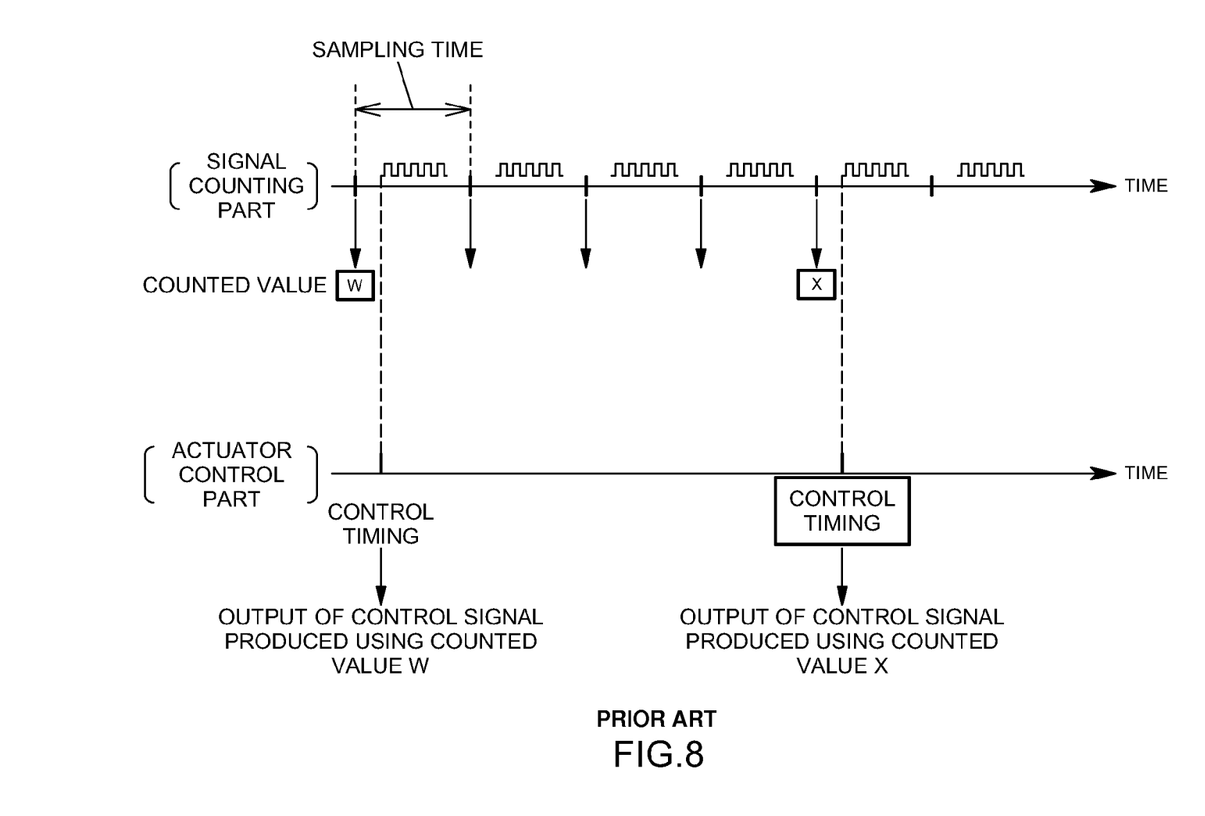
FIG. 8 is a diagram showing a relationship between a counted value and a control timing in a conventional actuator control.

Here, it is considered that the controller is adapted to receive, for example, a pulse signal from a sensor part provided on, for example, a rotating drum of the chassis dynamometer based on a rotation of the rotating drum and that the controller includes a signal counting part for counting a pulse number of the pulse signal every predetermined sampling time and a control part for controlling, for example, the actuators and the like at control timings with predetermined intervals using the counted value obtained by the signal counting part. Specifically, as shown in FIG. 8, the control part is so constructed as to control the actuators at each of the control timings using the most recent (latest) counted value before the outstanding control timing in order to improve a response speed of controlling the actuators as much as possible.

However, there may be a case where the signal counting part counts not only the pulse signals from the sensor part but also noise signals such as beard-like pulse signals etc., and therefore the most recent counted value for use in generating a control signal may include the noise signal components. In such a case, the actuator parts are controlled using the counted value of the pulse signals containing the noise components, which results in a problem that the speed of the vehicle cannot be accurately controlled.

CITATION LIST

Patent Literature

Patent literature 1: JP2005-003560A

SUMMARY OF INVENTION

Technical Problem

Therefore, the present invention has been made to solve the problem at once, and an essential object thereof is not only to suppress the noise components contained in the signal value of the detection signal for use in controlling the rate of rotations or speed as much as possible but also to select suppression of the noise components or improvement of the response speed in accordance with variation aspects of the signal value of the detection signal so that the rate of rotations or speed is appropriately controlled.

Solution to Problem

That is, a driving controller according to the present invention includes: a signal value acquisition part that receives a detection signal outputted from a sensor part in accordance with a rate of rotations or speed and acquires a signal value of the detection signal every predetermined sampling time; and a control part that controls the rate of rotations or speed at control timings with predetermined intervals using the signal value obtained by the signal value acquisition part, wherein, in the case where the plurality of signal values obtained before an outstanding control timing are monotonically increasing or monotonically decreasing, the control part controls the rate of rotations or speed using the most recent signal value before the outstanding control timing, and in the case where the plurality of signal values obtained before the outstanding control timing are not monotonically increasing or monotonically decreasing, the control part controls the rate of rotations or speed using the average value of the signal values.

With this configuration, in the case where the plurality of signal values obtained before the control timing are monotonically increasing or monotonically decreasing, the most recent signal value is used so that a response speed can be increased as much as possible. Meanwhile, in the case where the plurality of signal values obtained before the control timing are not monotonically increasing or monotonically decreasing, the average value thereof is used so that noise components contained in the signal values can be reduced, whereby robustness can be improved while sacrificing a response speed a bit, and the rate of rotations or speed can be accurately controlled. Thus, according to the present invention, suppression of the noise components or improvement of the response speed is selected in accordance with variation aspects of the signal value so that the rate of rotations or speed can be appropriately controlled.

In order to be able to precisely control the rate of rotations of the chassis dynamometer for use in a vehicle performance test system etc., and in order to precisely control an actuator part mounted on a vehicle on the chassis dynamometer, it is desirable that the sensor part is provided on a rotating drum of the chassis dynamometer and outputs a pulse signal based on the rotation of the rotating drum and that the signal value acquisition part receives the pulse signal and counts the pulse number of the pulse signal every predetermined sampling time.

When a large noise is included in a detection value, in order to surely prevent a usually impossible rate of rotations or speed from being detected to thereby control the rate of rotations or speed more accurately, in the case where an absolute value of a rate of change of the rate of rotations or speed indicated by the signal value of the detection signal acquired by the signal value acquisition part exceeds a threshold that is set based on an inertia or mass of a measurement target which is provided with the sensor part, the control part may be adapted not to use the acquired signal value of the detection signal for controlling the rate of rotations or speed. With this configuration, in the case where a measurement target which is provided with e.g. a sensor part has a large mass, an upper limit of the rate of change and a lower limit of the rate of change can be particularly set to a small value, and therefore the signal value including a noise can be surely excluded.

As a specific aspect in order to be able to execute a control at a reasonable rate of rotations or speed without significantly changing a control algorithm even if the signal value including a noise is excluded, there is shown a configuration that, in the case where the signal value of the detection signal acquired by the signal value acquisition part is not used, the control part controls the rate of rotations or speed using the signal values acquired by the signal value acquisition part one sampling time before the unused signal value is acquired.

A driving control program according to the present invention is a driving control program for allowing control equipments to execute a function as a signal value acquisition part that receives a detection signal outputted from a sensor part in accordance with a rate of rotations or speed and acquires a signal value of the detection signal every predetermined sampling time, and to execute a function as a control part that controls the rate of rotations or speed at control timings with predetermined intervals using the signal value obtained by the signal value acquisition part, wherein, in the case where the plurality of signal values obtained before an outstanding control timing are monotonically increasing or monotonically decreasing, the control part controls the rate of rotations or speed using the most recent signal value before the outstanding control timing, and in the case where the plurality of signal values obtained before the outstanding control timing are not monotonically increasing or monotonically decreasing, the control part controls the rate of rotations or speed using the average value of the signal values.

When a noise is included in the signal value, as a measuring device of the present invention capable of preventing a significantly abnormal rate of rotations or speed from being outputted and appropriately usable for various controls, there is shown a configuration that, the measuring device includes: a signal value acquisition part that receives a detection signal outputted from a sensor part in accordance with a rate of rotations or speed and acquires a signal value of the detection signal every predetermined sampling time; and an output part for outputting the rate of rotations or speed using the signal value obtained by the signal value acquisition part, wherein in the case where an absolute value of a rate of change of the rate of rotations or speed indicated by the signal value of the detection signal acquired by the signal value acquisition part exceeds a threshold that is set based on an inertia or mass of a measurement target which is provided with the sensor part, the output part is that outputs the rate of rotations or speed without using the signal value acquired by the signal value acquisition part.

Advantageous Effects of Invention

According to the present invention thus configured, it becomes possible not only to suppress the noise components contained in the signal value of the detection signal for use in controlling the rate of rotations or speed as much as possible but also to select suppression of the noise components or improvement of the response speed in accordance with variation aspects of the signal value of the detection signal so that the rate of rotations or speed can be appropriately controlled.

DESCRIPTION OF EMBODIMENTS

The following describes one embodiment of a vehicle performance test system 100 according to the present invention with reference to the accompanying drawings.

Figure 1:
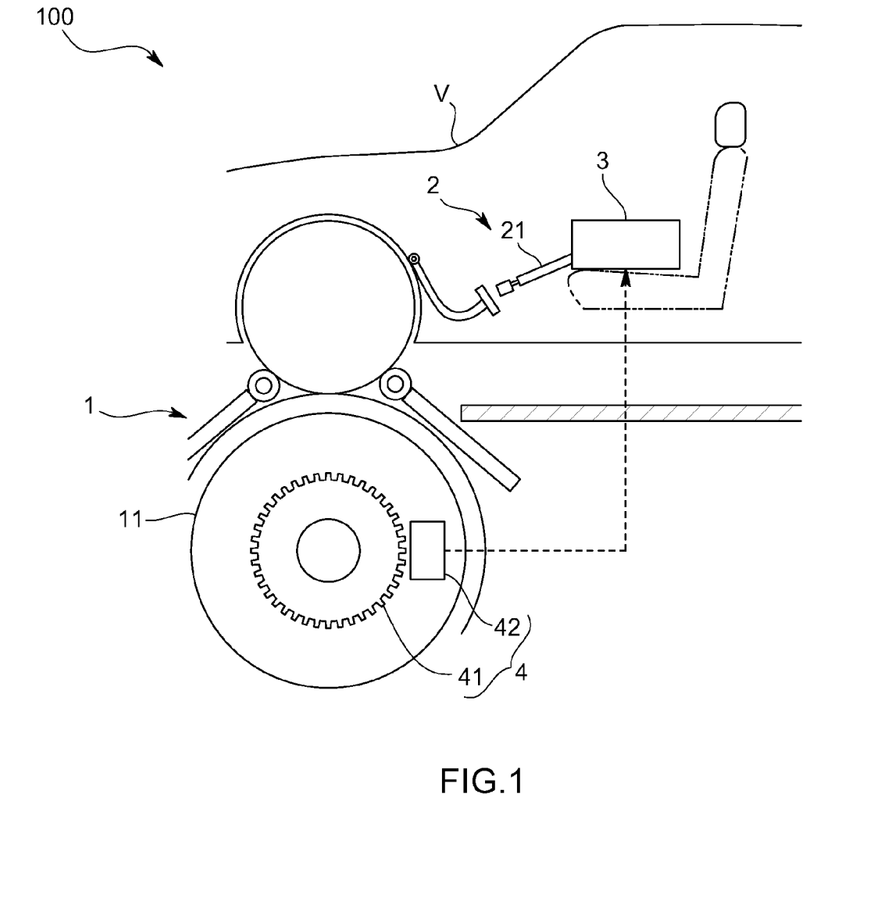
FIG. 1 is a schematic configuration diagram of a vehicle performance test system according to one embodiment of the present invention.

The vehicle performance test system 100 according to the present embodiment is intended to perform measurements of an automobile exhaust gas and, as shown in FIG. 1, the vehicle performance test system 100 is provided with a chassis dynamometer 1 on which a vehicle V is mounted, an automatic driving mechanism 2 for operating and automatically driving the vehicle V and an automatic driving mechanism controller 3 for controlling the automatic driving mechanism 2. Further, although not shown, the vehicle performance test system 100 is typically provided with a dynamo controller for controlling the chassis dynamometer 1, an exhaust gas measuring device for continuously measuring each of components such as HC, $NO_x$, CO, $CO_2$ etc. contained in the exhaust gas discharged from the vehicle V, and a central information processing unit and the like.

It is noted here that the dynamo controller and the exhaust gas measuring device are constructed by using a computer system or hardware comprised of such as a CPU and a memory etc. and have an ability to intercommunicate with external equipments by sending and receiving control signals and data etc. The central information processing unit is a computer system provided with, for example, a CPU, a memory, a communications interface, a display, input means and the like and normally has a server function. Thus, transmission and receipt of data is performed between each of the controllers and the exhaust gas measuring device over a network such as a LAN etc., so that the centralized control and data management of each of the controllers and the exhaust gas measuring device can be executed.

And by giving necessary parameters of vehicle information and a driving mode etc. to e.g. the central information processing unit, the chassis dynamometer 1 and the automatic driving mechanism 2 are subject to centralized control via these automatic driving mechanism controller 3 and the dynamo controller etc., and thus the vehicle V is driven in a desired manner, and the exhaust gas measuring device is operated so that the exhaust gas data is automatically measured, and further the exhaust gas data and driving data are correctively managed by the central information processing unit.

The chassis dynamometer is, for example, a single shaft part that includes a rotating drum 11 for putting drive wheels of the vehicle V thereon and a motor (not shown) for applying a load to the rotating drum 11. In the chassis dynamometer 1, the motor is controlled by the dynamo controller to thereby control a driving load so that the vehicle V can be driven in a state similar to that on a road.

In addition, the chassis dynamometer 1 is provided with a rotation detecting mechanism 4 for detecting a rate of rotations of the rotating drum 11. The rotation detecting mechanism 4 is provided on the rotating drum 11 and includes a gear 41 that rotates with rotation of the rotating drum 11 and a sensor part 42 using such as a hall element etc. for outputting a pulse signal in accordance with the rotation of the gear 41. The number of pulses outputted from the sensor part 42 per a unit time is proportional to a vehicle speed, and the automatic driving mechanism 2 is controlled by using the pulse number as to be described later. As for the rotation detecting mechanism 4, other configuration such as a proximity sensor, a photoelectric sensor, a rotary encoder and the like may be used, so long as it outputs a pulse signal with rotation of the rotating drum 11.

The automatic driving mechanism 2 is placed in a driver's seat etc. of the vehicle V and includes a drive arm part 21 that is an actuator for mechanically driving an accelerator, a brake, a shift lever, a handle and the like. By operating the drive arm part 21 based on a control signal from an external portion, the vehicle V is automatically driven on the chassis dynamometer 1.

The automatic driving mechanism controller 3 is adapted to control the automatic driving mechanism 2 in order that the vehicle V is driven in a given desired driving mode. Similarly to the dynamo controller, the automatic driving mechanism controller 3 is configured by using a computer system including such as a CPU and a memory etc. and normally has an ability to intercommunicate with external equipments by sending and receiving control signals and data etc.

Figure 2:
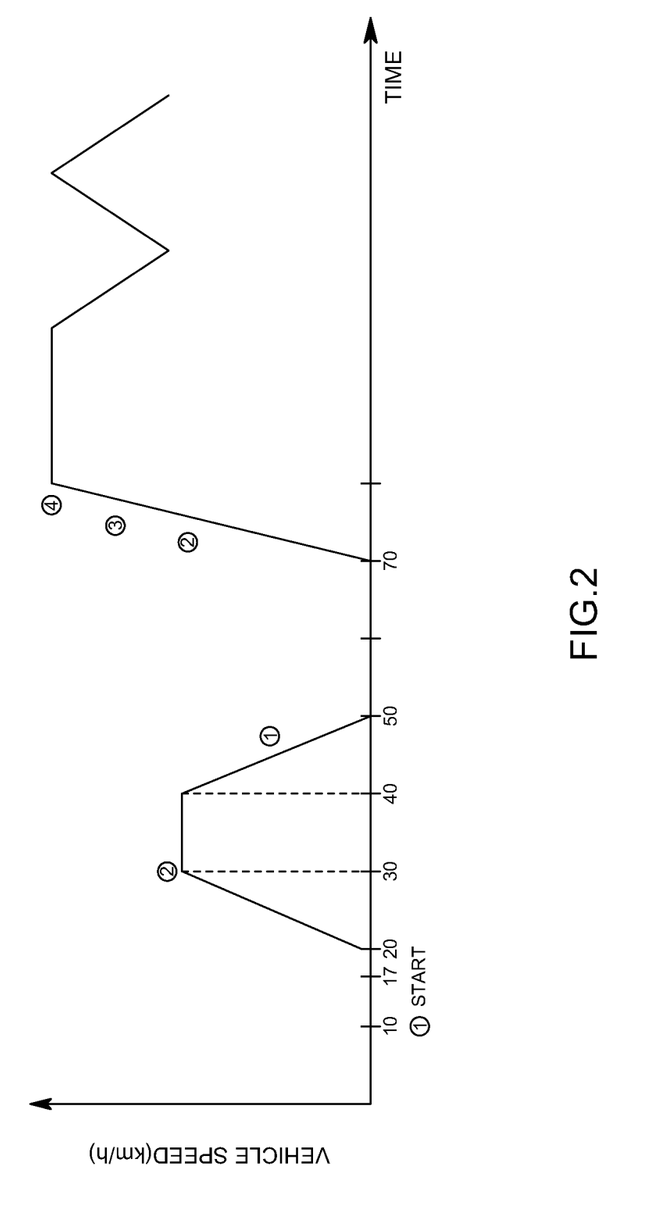
FIG. 2 is a diagram showing one example of a driving pattern.
Figure 3:
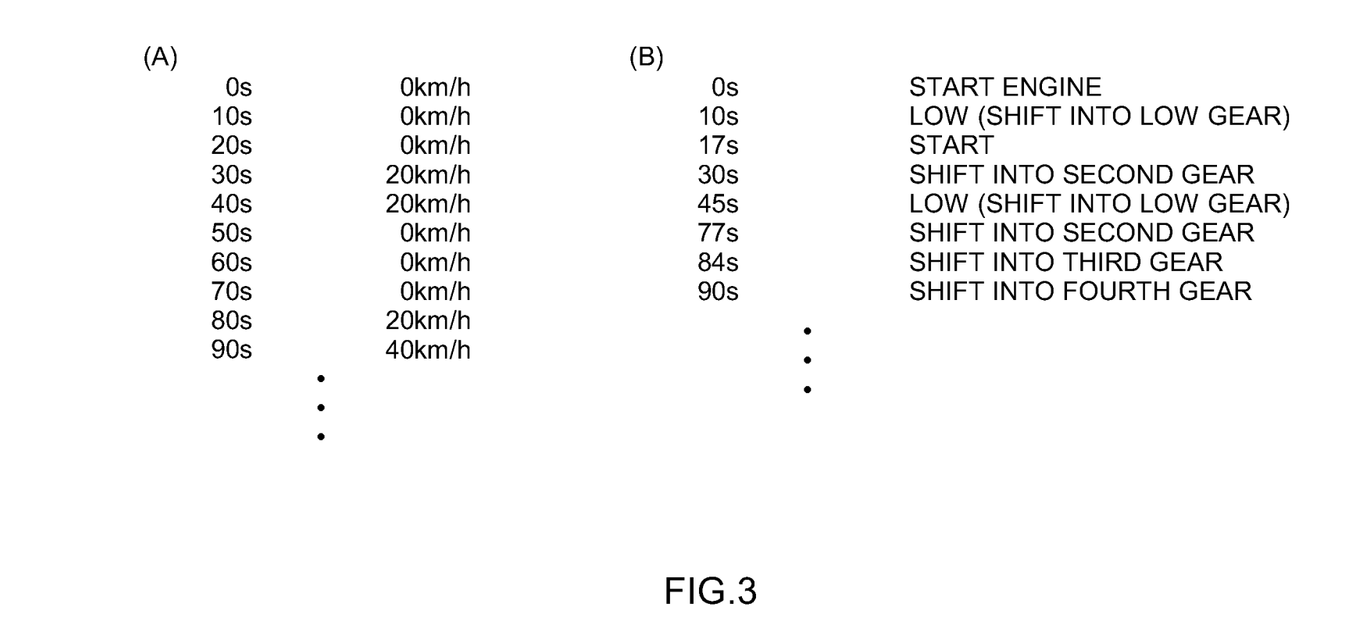
FIG. 3(A) is a diagram showing one example of a driving schedule.
FIG. 3(B) is a diagram showing one example of a schedule shift point.

More specifically, in the case where the vehicle V as a test target is driven by the automatic driving mechanism 2 so as to measure the exhaust gas discharged at that time, the automatic driving mechanism controller 3 executes a programmed driving based on a predetermined driving pattern as shown in FIG. 2. In this case, the vehicle V is generally controlled in accordance with schedules including a speed schedule and a speed shift point schedule as shown in FIGS. 3 (A) and (B), respectively.

It is noted here that an arrangement aspect of the central information processing unit, each of the controllers and the exhaust gas measuring device may be physically dispersed in separation or a part or entire thereof may be integrated. The driving controller is configured by the central information processing unit and each of the controllers. It is also possible that a function of the automatic driving mechanism controller 3 is implemented by a different controller other than that and the automatic driving mechanism 2 can be controlled based on the control signal supplied from the different controller via the automatic driving mechanism controller 3.

Figure 4:
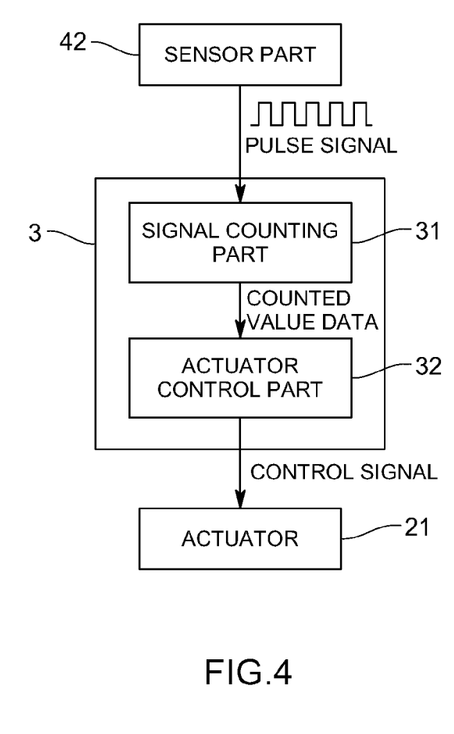
FIG. 4 is a functional configuration diagram of a controller of the same embodiment.

Thus, in the vehicle performance test system 100 of the present embodiment, as shown in FIG. 4, the automatic driving mechanism controller 3 includes a signal counting part (signal value acquisition part) 31 for receiving a pulse signal that is a detection signal from the sensor part 42 and counting the pulse number of the pulse signal every predetermined sampling time $T_{samp}$ and further includes an actuator control part 32 for controlling the actuator 21 at control timings with predetermined intervals.

Figure 5:
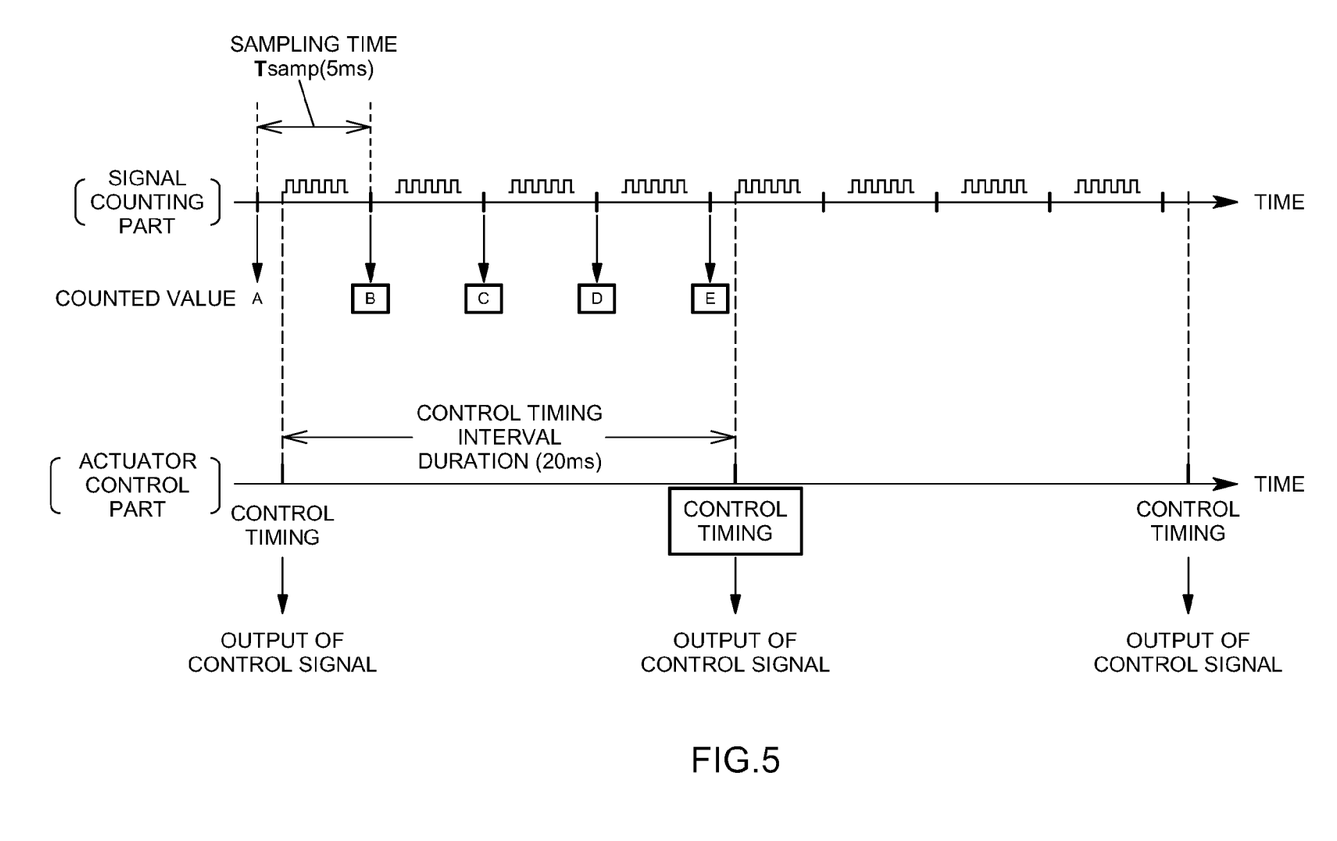
FIG. 5 is a diagram showing a relationship between a sampling time and a control timing.

The signal counting part 31 receives the pulse signal outputted from the sensor part 42 when it is activated by the chassis dynamometer 1 and counts the pulse number of the pulse signal every predetermined sampling time (e.g., $T_{samp}$=5 ms), as shown in an upper part of FIG. 5. Specifically, the signal counting part 31 counts the pulse number of signals as the pulse signal when each of the signals has a peak value (voltage value) exceeding a predetermined value among the signals outputted from the sensor part 42, whereby the counted value (i.e., signal value) is calculated.

The actuator control part 32 outputs the control signals to be applied to the actuator 21 at control timings with predetermined intervals (each of which is e.g. 20 ms), as shown in a lower part of FIG. 5. At this time, the actuator control part 32 acquires a plurality of counted values obtained by the signal counting part 31 in a predetermined period of time before the outstanding control timing in each of the control timings. The counted values (signal values) obtained by the actuator control part 32 are stored in a signal value storage part (not shown). In the case where the obtained plurality of counted values are monotonically increasing or monotonically decreasing, the actuator control part 32 generates each of the control signals using the most recent counted value before the outstanding control timing and then supplies the control signals to the actuator 21.

On the other hand, in the case where the obtained plurality of counted values are not monotonically increasing or monotonically decreasing, the actuator control part 32 generates each the control signals using a value obtained with these counted values as parameters, specifically, using an average value thereof and then supplies the control signals to the actuator 21. These control signals are generated based on the counted values of the pulse signals related to the vehicle speed, and the control signals are supplied to the actuator 21 (in particular, to an accelerating actuator, a braking actuator, and a shift lever actuator) for adjusting the speed of the vehicle.

As shown in FIG. 5, the actuator control part 32 of the present embodiment uses the counted values (B, C, D, E) counted by the signal counting part 31 after the last control timing to the outstanding control timing as a plurality of counted values acquired in a predetermined period of time before the outstanding control timing. It is noted here that the predetermined period of time before the outstanding control timing means a time period (i.e., interval duration of control timings) from the last control timing to the current control timing and is a time period of 20 ms before the outstanding control timing.

Figure 6:
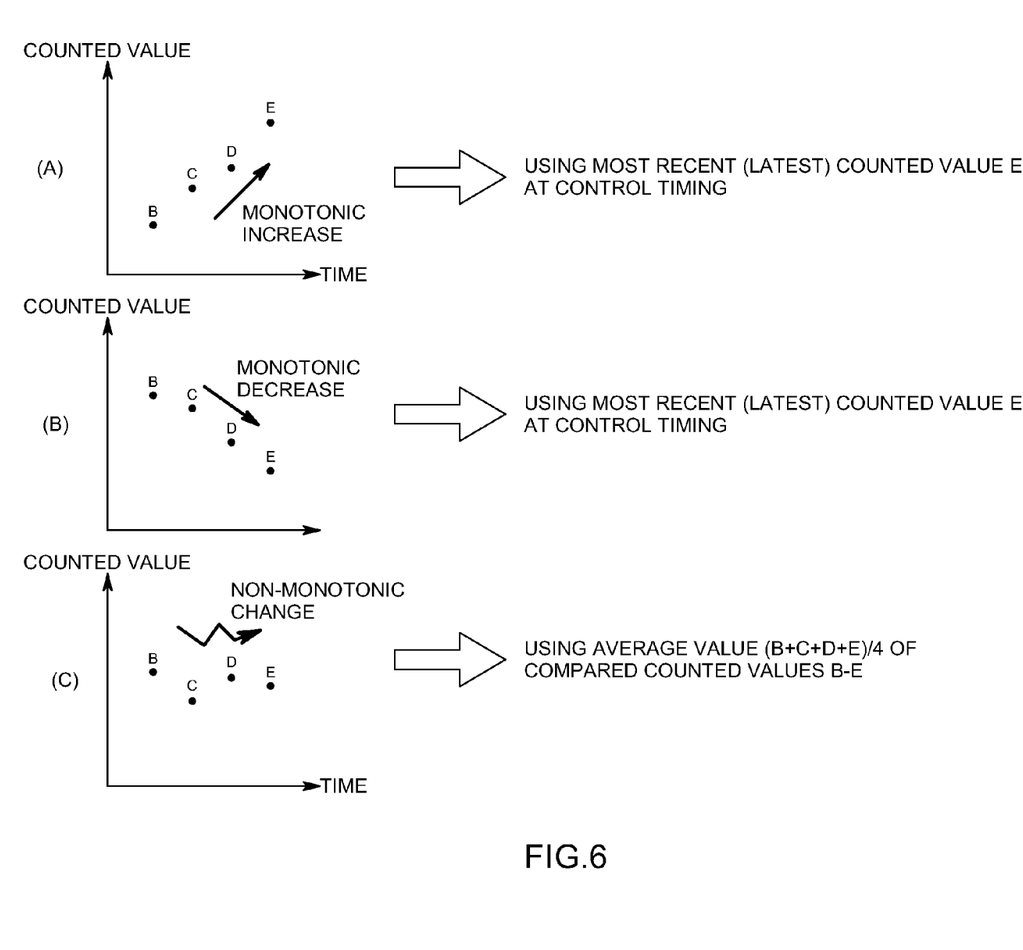
FIG. 6 is a diagram schematically showing a way of selecting a count value for an actuator control part.

The actuator control part 32 compares the counted values to each other in the order calculated by the signal counting part 31, and in the case where the plurality of counted values (B-E) are monotonically increasing or monotonically decreasing as shown in FIG. 6 (A) or (B), i.e., when in an acceleration state or a deceleration state, the actuator control part 32 generates the control signal using the counted value (E) obtained most recently to the outstanding control timing, i.e., the last obtained counted value. On the other hand, in the case where the counted values (B-E) are not monotonically varied as shown in FIG. 6 (C), i.e., when varied at random, the average value ((B+C+D+E)/4) of the plurality of counted values (B-E) is calculated to thereby generate the control signal with use of the average value.

Effect of the Embodiment

According to the vehicle performance test system 100 of the present embodiment configured as described above, in the case where the plurality of counted values obtained before the control timing are monotonically increasing or monotonically decreasing, the most recent counted value is used so that a response speed can be increased as much as possible. Meanwhile, in the case where the plurality of counted values obtained before the control timing are not monotonically increasing or monotonically decreasing, noise components contained in the counted values can be reduced by using the average value thereof so that robustness can be improved while sacrificing a response speed a bit, and the vehicle speed can be accurately controlled.

Other Alternative Embodiment

It is noted that the present invention is not intended to limit to the above embodiment.

For example, in the above embodiment, although the counted value of the pulse signal from the sensor part is used to control the actuators to thereby control the vehicle speed, other means may be adopted, for example, a rate of rotations of the rotating drum of the chassis dynamometer may be controlled, or a rate of rotations of an engine in an engine dynamometer may be controlled, with use of the method similar to the above embodiment. It may be also possible to control a brake dynamometer. Further, the present invention can be also applied as a controller of a device which has a rate of rotations or speed as a target to be controlled other than those of the above.

In the above embodiment, although the sensor part outputs a pulse signal and the signal value acquisition part counts the pulse number of the pulse signal every sampling time, the sensor part may be adapted to output a continuous signal other than a pulse signal so that the signal value acquisition part may acquire a peak value (e.g., voltage value) as a signal value of the continuous signal every sampling time. Also, in this case, similarly to the above embodiment, the control part gets a plurality of signal values obtained by the signal value acquisition part in a predetermined period before the outstanding control timing in each of the control timings. In this case, however, when a rate of rotations or speed is controlled using a sensor that outputs a voltage value, a power supply noise and electromagnetic noise may be possibly included in the signal. This problem can be addressed by applying the present invention, and the rate of rotations or speed can be controlled while suppressing these noise components.

In the above embodiment, although a time period (i.e., interval duration of control timings) from the last control timing to the current control timing is used as the predetermined period before the control timing, the period is not limited to this, and any other period may be used so long as a plurality of counted values can be obtained in the period, but not particularly limited.

Furthermore, if the counted value obtained from the signal counting part is an abnormal value which is considered to be impossible to be taken judging from an inertia of the rotating drum, the actuator control part excludes the abnormal counted value from the decision as to whether the counted values are monotonously increasing/decreasing or not, and the abnormal counted value is not used for generating the control signal.

In other words, it is only necessary that, in the case where the absolute value of the rate of change of the rate of rotations or speed indicated by the value counted by the signal counting part exceeds a threshold that is set based on the inertia or mass of a measurement target on which the sensor part is provided, the control part may be configured so as not to use the acquired signal value of the detection signal for controlling the rate of rotations or speed. More specifically, when the gear is assumed to be neutral, a value in a degree of, for example, 5000-20000 rpm/s may be set as the threshold for the rate of rotations. By setting such a threshold in advance, even if a noise is included in the counted values, it becomes possible to surely prevent an impossible value as a rate of rotations or speed from being used for controlling the rate of rotations or speed. Since the rate of rotations of the engine is varied according to gear position, an upper limit of the rate of change may be set according to these matters. In addition, in the case where the threshold is set by an acceleration, it may be set to, for example, 8-10 km/h/s. Also, regarding the case of deceleration, an absolute value may be similarly used and the threshold may be set in consideration of, for example, other factors such as brakes. As the rate of change, it may be a rate of change obtained from the last sampled signal values, but it may be a rate of change obtained from, for example, an average of a plurality of sampled signal values before the control timing.

Figure 7:
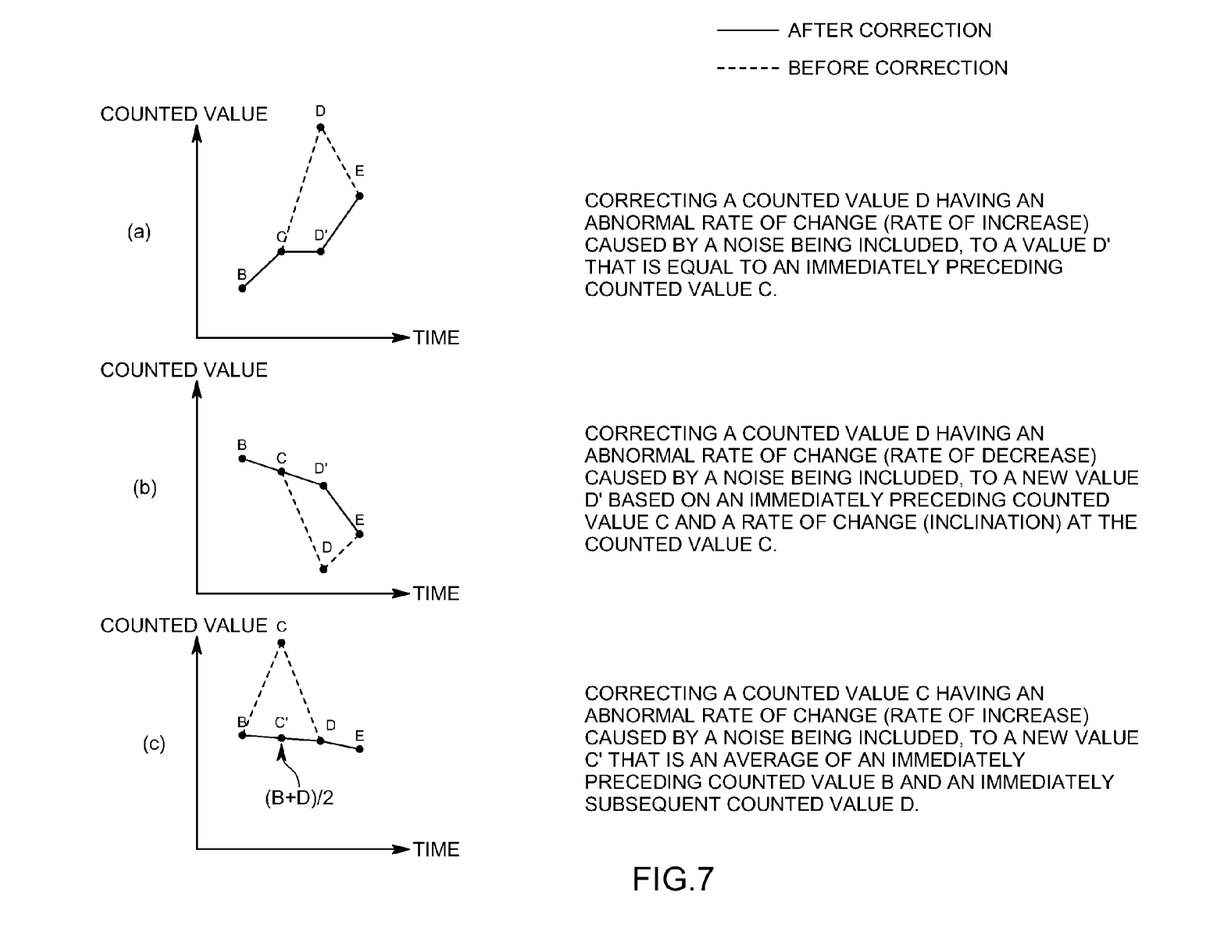
FIG. 7 is a diagram schematically showing a way of correcting a counted value for an actuator control part in a vehicle performance test system according to another embodiment of the present invention.

Next, the following describes a case where the rate of rotations or speed is controlled using other values without using the obtained signal values because a noise has been included, with reference to FIG. 7. FIG. 7 shows a case where only one of the counted values is largely alienated among the values counted by the signal counting part in a certain sampling time in the period after the last control timing to the current control timing.

For example, as shown in FIG. 7 (*a*), there is shown a configuration that, in the case where a signal value acquired by the signal value acquisition part is not used, the control part controls the rate of rotations or speed using the signal values acquired one sampling time before the unused signal value is acquired. With this configuration, since a computing load is small, it is easy to instantaneously use an alternative reasonable rate of rotations or speed to be controlled. Also, as shown in FIG. 7 (*b*), an alternative value in place of the omitted counted value may be calculated based on the rate of change (such as acceleration) of the counted values counted in the period of one sampling time before a time point when the counted value including a noise is acquired. In addition, as shown in FIG. 7 (*c*), an average of the counted values before and after the omitted counted value due to inclusion of a noise is obtained to be used as a new value in place of the omitted counted value. Also, a predetermined value in place of the omitted counted value may be used. More specifically, as the predetermined value, there may be used a maximum value of the rate of rotations or speed which can be outputted by a measurement target, or may be used a value obtained by multiplying the maximum value by a predetermined value. With these configurations as described above, since an abnormal counted value of the rate of change is omitted and an appropriate value is estimated, the control part can appropriately decide as to whether the counted values are monotonically increasing/decreasing or not, and it becomes possible to control the rate of rotations or speed more accurately.

In addition, a measuring device may be configured to measure the rate of rotations or speed using the methods as described above. That is, such a measuring device includes a signal value acquisition part that receives a detection signal outputted from a sensor part in accordance with a rate of rotations or speed and acquires a signal value of the detection signal every predetermined sampling time, and further includes an output part for outputting the rate of rotations or speed using the signal value obtained by the signal value acquisition part, wherein in the case where the absolute value of the rate of change of the rate of rotations or speed indicated by the signal value of the detection signal exceeds a threshold value that is set based on an inertia or mass of the measurement target on which the sensor part is provided, the output part may be adapted to output the rate of rotations or speed without using the signal value obtained by the signal value acquisition part.

Also, it is needless to say that, in addition to the chassis dynamometer in the above embodiment, a pair of rotating drums 11 may be provided back and forth in order to comply with a four wheel drive (4WD), and a two-shaft typed one may be also configured.

The present invention is not limited to the above embodiments, and it is needless to say that various modifications may be made without departing from its spirit.

INDUSTRIAL AVAILABILITY

According to the driving controller and program and the measuring device of the present invention, there can be obtained an effect such that not only the noise components can be suppressed as much as possible even if contained in the signal value of the detection signal for use in controlling the rate of rotations or speed, but also suppression of the noise components or improvement of the response speed can be selected in accordance with variation aspects of the detection signal value so that the rate of rotations or speed can be appropriately controlled.

REFERENCE SIGNS LIST

100 . . . Vehicle performance test system
V . . . Vehicle
1 . . . Chassis dynamometer
11 . . . Rotating drum
21 . . . Actuator
3 . . . Controller
31 . . . Signal counting part (signal value acquisition part)
32 . . . Actuator control part
42 . . . Sensor part

The invention claimed is:

1. A driving controller comprising:
a controller including
a signal value acquisition part that, every predetermined sampling time, receives a detection signal outputted from a sensor part in accordance with a rate of rotations or speed and acquires a signal value for the detection signal, and
an actuator control part that controls the rate of rotations or speed at control timings with predetermined intervals using the signal value obtained by the signal value acquisition part, wherein
in response to a plurality of signal values obtained before an outstanding control timing monotonically increasing or monotonically decreasing, the actuator control part controls the rate of rotations or speed using the most recent signal value before the outstanding control timing, and
in response to the plurality of signal values obtained before the outstanding control timing not monotonically increasing or monotonically decreasing, the actuator control part controls the rate of rotations or speed using an average value of the plurality of signal values obtained before the outstanding control timing.

2. The driving controller according to claim 1, wherein the sensor part is provided on a rotating part of a dynamometer and outputs a pulse signal based on the rotation of the rotating part, and wherein the signal value acquisition part receives the pulse signal and counts a pulse number of the pulse signal every predetermined sampling time.

3. The driving controller according to claim 1, wherein in response to an absolute value of a rate of change of the rate of rotations or speed indicated by the signal value of the detection signal acquired by the signal value acquisition part exceeding a threshold value that is set based on an inertia or mass of a measurement target which is provided with the sensor part, the actuator control part does not use the acquired signal value of the detection signal for controlling the rate of rotations or speed.

4. The driving controller according to claim 3, wherein in response to the actuator control part not using the signal value acquired by the signal value acquisition part, the actuator control part controls the rate of rotations or speed using the signal value acquired by the signal value acquisition part one sampling time before the unused signal value is acquired.

5. A driving control program in a non-transitory computer readable medium for allowing control equipments to execute a function as a signal value acquisition part that, every predetermined sampling time, receives a detection signal outputted from a sensor part in accordance with a rate of rotations or speed and acquires a signal value for the detection signal, and a function as an actuator control part that controls the rate of rotations or speed at control timings with predetermined intervals using the signal value obtained by the signal value acquisition part, wherein
in response to a plurality of signal values obtained before an outstanding control timing monotonically increasing or monotonically decreasing, the actuator control part controls the rate of rotations or speed using the most recent signal value before the outstanding control timing, and
in response to the plurality of signal values obtained before the outstanding control timing not monotonically increasing or monotonically decreasing, the actuator control part controls the rate of rotations or speed using an average value of the plurality of signal values obtained before the outstanding control timing.

6. A measuring apparatus comprising:
a measuring device including
a signal value acquisition part that receives a detection signal outputted from a sensor part in accordance with a rate of rotations or speed and acquires a signal value of the detection signal every predetermined sampling time, and
an output part for selectively outputting the rate of rotations or speed using the signal value obtained by the signal value acquisition part, wherein
the output part, in response to an absolute value of a rate of change of the rate of rotations or speed indicated by the signal value of the detection signal acquired by the signal value acquisition part exceeding a threshold that is set based on an inertia or mass of a measurement target which is provided with the sensor part, the output part selectively outputs the rate of rotations or speed without using the signal value acquired by the signal value acquisition part, and the output part, in response to the absolute value not exceeding the threshold the output part selectively outputs the rate of rotations or speed using the signal value acquired by the signal value acquisition part.

* * * * *